(12) United States Patent
Hachey et al.

(10) Patent No.: US 7,972,138 B2
(45) Date of Patent: Jul. 5, 2011

(54) DEVICE FOR DRAWING LINES ON A SIZED SHEET OF PAPER AND MAINTAINING REGISTRATION OF THE PAPER WHEN IT HAS BEEN REMOVED AND IS BEING REPLACED ON THE DEVICE

(75) Inventors: Daniel Louis Hachey, Bonita Springs, FL (US); Ryan Loron Johnson, Bonita Springs, FL (US)

(73) Assignee: Sketch-It LLC of Delaware, Bonita Springs, FL (US)

( * ) Notice: Subject to any disclaimer, the term of this patent is extended or adjusted under 35 U.S.C. 154(b) by 578 days.

(21) Appl. No.: 12/069,350

(22) Filed: Feb. 8, 2008

(65) Prior Publication Data

US 2008/0241802 A1 Oct. 2, 2008

Related U.S. Application Data

(63) Continuation-in-part of application No. 11/508,767, filed on Aug. 23, 2006, now abandoned.

(51) Int. Cl.
*G09B 11/00* (2006.01)
(52) U.S. Cl. ......................................... 434/85
(58) Field of Classification Search .................. 434/81, 434/85, 86–90, 162, 166, 404, 425, 430, 434/115, 117, 185
See application file for complete search history.

(56) References Cited

U.S. PATENT DOCUMENTS

| | | | | |
|---|---|---|---|---|
| 1,061,913 | A * | 5/1913 | Hughes | 434/164 |
| 1,371,430 | A * | 3/1921 | Nickerson | 434/117 |
| 1,372,360 | A * | 3/1921 | McNeill | 434/117 |
| 3,579,867 | A * | 5/1971 | Kuhn | 434/117 |
| 4,223,447 | A * | 9/1980 | Greenlees | 33/443 |
| 4,451,519 | A * | 5/1984 | Irrgeher | 428/167 |
| 4,679,328 | A * | 7/1987 | Saad | 33/447 |
| 5,217,378 | A * | 6/1993 | Donovan | 434/116 |
| 5,599,189 | A * | 2/1997 | Kees | 434/370 |
| 6,241,528 | B1 * | 6/2001 | Myers | 434/408 |
| D502,964 | S * | 3/2005 | Cziraky | D19/36 |
| 6,866,516 | B2 * | 3/2005 | Smith et al. | 434/408 |
| 7,717,468 | B2 * | 5/2010 | Isaacs | 281/45 |

* cited by examiner

*Primary Examiner* — Kurt Fernstrom
(74) *Attorney, Agent, or Firm* — Doonan Dwight McGraw

(57) ABSTRACT

Improvements in the instruments for drawing lines using grooves providing the presentation of lines that may be drawn by placing a sheet of paper over the presentation and engaging the sheet of paper with the point of a writing tool with sufficient force to press the engaged part of the paper into a selected groove and then moving the writing tool point within the line, depositing pencil lead or ink from the end of the writing tool on the paper that is pressed into the selected groove to form a line on the paper. The improvements include the provision of registration marks on a clipboard which has the presentation of grooves for lines to be drawn on the upper side of the clipboard, the registration marks acting as guidelines for the precise placement of the sheet of paper on which lines are to be drawn.

20 Claims, 4 Drawing Sheets

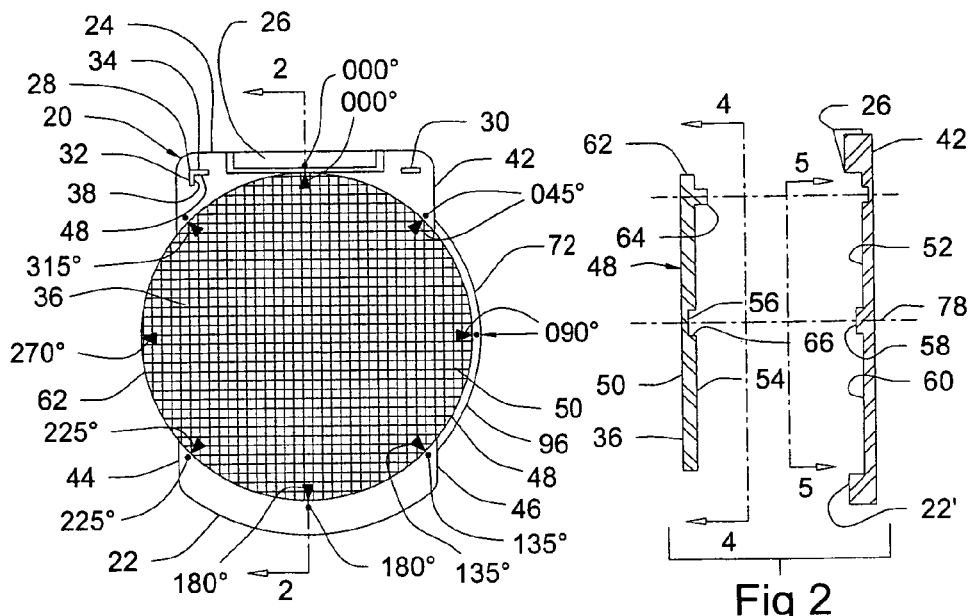
Fig 1
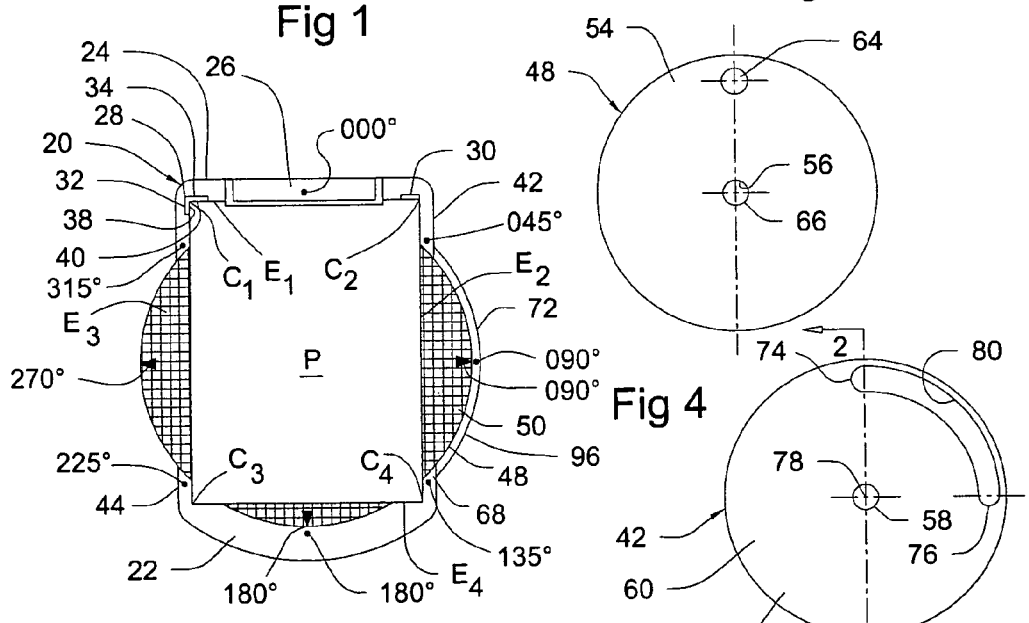
Fig 2
Fig 3
Fig 4
Fig 5

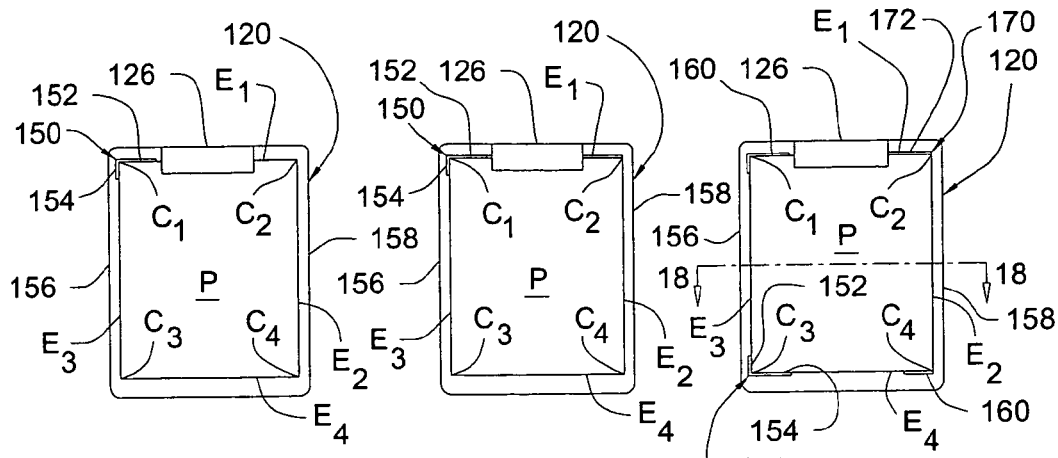
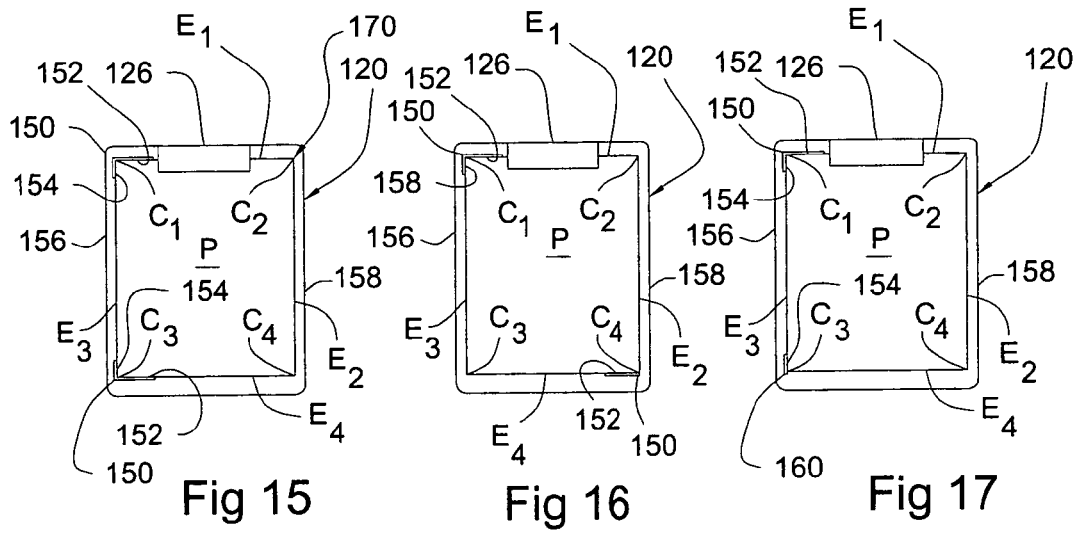
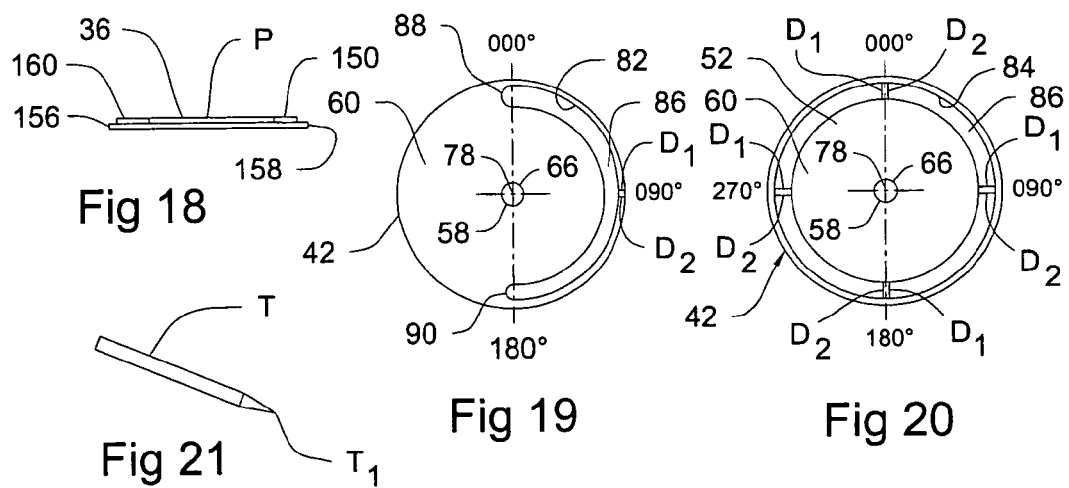
Fig 12  Fig 13  Fig 14  Fig 15  Fig 16  Fig 17  Fig 18  Fig 19  Fig 20  Fig 21

DEVICE FOR DRAWING LINES ON A SIZED SHEET OF PAPER AND MAINTAINING REGISTRATION OF THE PAPER WHEN IT HAS BEEN REMOVED AND IS BEING REPLACED ON THE DEVICE

This patent application is a continuation-in-part of U.S. patent application Ser. No. 11/508,767, filed on Aug. 23, 2006, now abandoned by the same inventors as named herein. That application contains some improvements to the invention disclosed and claimed in the Phillips patent noted in the BACKGROUND, below.

FIELD OF THE INVENTION

Aids for drawing straight lines or various curvilinear lines that improve hand sketching and drawing by providing cleaner and more precise lines than is usually obtainable when one hand sketches on a typical sheet of paper. The aids include a textured groove pattern surface over which the sheet of paper is precisely placed. The aids also provide for the relocation of a sheet of paper over the textured groove pattern surface, after it has been removed with at least one line having been drawn on it, over the aid having the textured groove pattern surface for aiding a person to draw lines, so that is precisely realigned with that aid and the earlier-drawn line or lines are back in the exact same position as they were when they were drawn. This permits other lines to be drawn on the sheet of paper in accurate relation to the earlier-drawn line or lines. The aids also make provision for drawing one or more lines at other specific acute or obtuse angles to another line or lines previously drawn, or to be later drawn, which could not be so otherwise easily drawn with the paper in place. This is accomplished by having an angle-indexed rotatable section, having the textured groove pattern surface thereon, located under the sheet of paper that is retained so that the lines being drawn by use of the aids may be drawn at various angles to lines that have been drawn before the rotatable section has been rotated, and that rotatable section may be oppositely rotated to return to the original position where the earlier line or lines were drawn and the rotatable section of the textured groove pattern is precisely aligned with the lines earlier drawn on the sheet of paper.

BACKGROUND OF THE INVENTION

The U.S. Pat. No. 3,384,964-Phillips, issued on May 28, 1968, shows a textured groove pattern surface on which a sheet of paper is placed, and drawings of lines, curves, etc., can be made, using a writing tool by pressing on the paper so that the writing tool writing end enters into and as moved passes along a line defined by the textured groove pattern surface pattern to draw a line, whether straight or curved in any manner, the line then appearing on the paper in accordance with the pattern of textured grooves or lines formed on the textured groove pattern surface. The above-noted pending patent application shows and claims some changes which are improvements to the arrangement disclosed in the Phillips patent.

For the purposes of description in this document, the terms "sketch" and "drawing" are considered to be any marking made by a sketcher or draftsman or some other person on a paper sheet using any textured groove pattern, and do not preclude other markings also made on the paper sheet using a different manner of drawing or sketching. There is a deficiency of the Phillips patent in that after the top of the textured paper on which some but not all of a sketch or drawing has been made and the paper sheet is then removed from that textured groove pattern surface, and thereafter there is an attempt made to replace the paper sheet over the textured surface, it cannot be conveniently or easily relocated precisely to the position it was in when earlier drawings had been made over it. Returning the paper sheet to that position cannot be done without considerable difficulty, if it can even be done satisfactorily at all, because there are no accurate guides available for that purpose. There is also an inherent problem with the structure shown in the Phillips patent when someone who needs to draw angled lines angled at any degree of angle other than those permitted by the textured groove pattern that is under the paper sheet. It can be attempted after having removed the paper sheet from the textured pattern below it. Once that has been done, however, there is no assured precise re-registration capability shown or suggested by Phillips once the desired angled lines are earlier drawn, and the person doing the drawing desires to return the paper to its precise original registration to either add to the drawing or to rework the drawing at a later time and keep the additions or rework in proper registration relative to the textured groove pattern that was earlier used for drawing on the paper sheet.

SUMMARY OF THE INVENTION

The basic concept of the above-noted Phillips patent is improved by the use of at least one of the features of the invention herein disclosed and claimed, providing one or more paper sheet registration marks or devices, located on the clipboard main body and near the textured groove pattern sheet, that will keep the paper sheet on which the sketching is done in a specific position both horizontally and vertically. Even though the paper with the sketch work on it is removed, it can be replaced on the textured groove pattern sheet so that it is in precisely the same registry position as it was during the earlier sketching, and any additions to the earlier sketch will be made with such precision that they will appear to be made at the same time as the earlier sketch. This may be repeated as many times as desired, and always with the same precise registry position result. The textured groove pattern sheet is preferably part of a clipboard, which provides a hard surface having the textured groove pattern lines for drawing being a part of that clipboard.

The registry position of a sheet of paper is set by having devices, herein referred to as registration marks, by preferably providing at least one L-shaped corner that establishes the precise position of a sheet of paper relative to the textured groove pattern sheet so that when the corner of a sheet of paper on which drawing is to be done is located in the L-shaped corner, it is also precisely positioned on the textured groove pattern sheet both horizontally and vertically. There can be additional registration marks when desired. These can be in the form of one or more straight registration marks setting the position of one or both sides and thus positioning the paper sheet even more positively horizontally. One or more additional straight registration marks may be located at the required location of the bottom of the paper sheet, or at the top, or both, relative to the textured groove pattern sheet for more precise registration of the paper sheet relative to the textured groove pattern sheet. Other L-shaped corner registration marks may be used to define the registration of the paper sheet precisely on the textured groove pattern sheet. Any suitable combination of such registration marks may be used within the purview of the invention. While the registration marks may be printed, painted or on an adhesively-backed label, or otherwise placed on the clipboard body. While they may be effectively flat and thus in the same plane as the plane of the part of the clipboard body where they are placed, it is preferable that the registration marks have a height extending upwardly from the plane of the part of the clipboard on which they are located that is just sufficient to accommodate paper sheets of several different thicknesses so that when thicker paper sheets are to be used for drawing thereon, they are able to be precisely positioned as described. The registration marks do not have to be as high as the full thickness of a thicker sheet in order to function properly and fully. The registration marks shown in the drawing are integrally made with the part of the clipboard main body on which they are located, by molding them with the molding of the clipboard main body. Alternatively, they may be made separately and then attached to the clipboard main body by any suitable attaching means, being very sure that they are precisely located so as to properly perform their functions.

The invention lying in a clipboard assembly includes an additional feature that is optional, but is much preferred. This feature comprising additional structure that will accommodate the drawing of acutely and obtusely angled lines relative to the horizontal or vertical orientation of the paper sheet being drawn upon. It includes a clipboard main body having the registration mark features noted above. The clipboard assembly also includes a rotatable disc portion on which the textured groove pattern is formed. The particular pattern that is most useful with the rotatable disc portion is that having a series of parallel lines extending vertically and another series of parallel lines extending at 90° thereto and intersecting the first series of parallel lines. Graph paper use such typical arrangements. That disc portion would preferably be injection molded with the desired textured groove pattern being a part of it. The surface of the part of that clipboard main body surrounding the rotatable disc portion and the textured groove pattern surface of the rotatable disc portion are located in the same plane so that the paper sheet on which the user will draw can lie flat so that it is engaging both portions of the clipboard assembly. The rotatable disc portion has indices such as one or more arrow points that can be aligned with a degree measurement scale on the fixed disc-receivable portion of the clipboard to allow for drawing accurate angles. The most important arrow point located on the rotatable disc portion is the one that is normally kept aligned with the 000° point of the fixed disc-receivable portion so that the vertical and horizontal grooves of the textured groove pattern are respectively aligned with the 000° point and the 090° point. This angular measurement scale can be as simple as identifying the cardinal and inter-cardinal angles at 000°, 045° and 090°. The angular measurement scale identifying the angles at which the rotatable disc portion may be rotated may be, and preferably are, indexed in greater detail. A detail like that on at 000° to 090°, as found on a typical protractor, is preferable. These are usually short, radially extending, lines, each line representing one angular degree, with somewhat longer lines for every fifth degree, and every tenth degree bearing its value. In this instance every tenth degree bearing its value would bear, in order, starting with the 000° point and proceeding to, in order, the points for 000°, 010°, 020°, 030°, 040°, 045°, 050°, 060°, 070°, 080°, and 090°. The cardinal and inter-cardinal points are included, even though the inter-cardinal point 045° is not one of the every-10° scale. Modifications if that scale can be made as may be appropriate without departing from the invention.

In its preferred embodiment, the rotating disc portion has a pin which engages a stop provided which is on or an integral part of the clipboard main body, usually at the 000° and the 090° positions, which limits it rotation to 90° of clockwise movements from the usually upright position where its main arrow is pointing at 000° on the angle scale. Of course, it may be arranged to limit such rotation in a counterclockwise manner. This 90° of rotational movement is sufficient to allow for all angles to be drawn. If a greater rotational angle movement is desired, then the stops would be at the opposite ends of the range of such angle movement, except when the angle movement is a full 360°, when there would be no stops, and only detents as further described.

This arrangement has an additional advantage in that there may be a series of rotatable disc portions usable with the same clipboard fixed portion which have differently arranged textured groove pattern surfaces, thus allowing a broader scope of drawings using curves and other configurations such as that shown and disclosed in the earlier noted patent to Phillips, and also a series of different allowed arcuate movement ranges as earlier mentioned. Other variations in the textured groove pattern surfaces include a variation to provide certain grooves that are wider than the others, allowing for making some heavier lines to be drawn. Still others may be grooved to draw certain shapes. In some engineering and architectural sketches, these shapes may be those accepted for electrical and plumbing drawings, building shapes, and even some circles, ovals, and polygons that are in addition to the typical square, rectangular and triangular shapes. A sketcher may even use more than one of the available different textured groove pattern disc portions with the same sheet of sketch paper, and the paper sheet will still be precisely placed relative to the particular textured groove pattern being used. When a sketcher is in a very specific technical area of endeavor, custom textured groove patterns fitting the special needs for that particular work may be provided. There may also be different clipboard main bodies for different widths of the paper sheets, as well as different lengths of the paper sheets. Because the clip main body made for use in the United States of America that is usually made to accommodate paper sheets that are 8.5 inches wide and 11 inches long, or for other countries using the A6 sized paper sheets that are somewhat narrower but a little longer, that may be the most common use for the countries using those sizes of paper sheets. Other countries may use still different sized paper sheets, usually measured using the metric system. In those countries, the most-used size would be appropriate for regular production. Those for other sizes would likely be made on an as-required basis, because relatively few of them are likely to be required.

BRIEF DESCRIPTION OF THE DRAWINGS

FIG. 1 is a plan view of a clipboard assembly that includes a clipboard having a turntable, which is the rotatable circular center section of the clipboard assembly. That turntable is textured on its upper side with a groove pattern section to provide guides for a writing tool that enables a sketcher to draw on a paper sheet placed over the textured groove pattern section and have the texture grooves guide the writing tool to make lines defined by the textures on the clipboard textured groove pattern section.

FIG. 2 is a cross-section view of the clipboard assembly of FIG. 1, taken in the direction of arrows 2-2 of that FIGURE. The two pieces are shown as being separated to better identify and describe their features.

FIG. 3 shows the clipboard assembly of FIG. 1 with a sheet of paper in place so that it is precisely positioned by the registration marks located on the clipboard main body, that particular sheet of paper being in precisely the same location on the clipboard main body and engaging at least portions of the parts of the clipboard main body upper surface that are not under the turntable, as well as the upper surface of the turntable, whether that particular sheet of paper is there for the first time, or is there after having been removed from there one or more times with some sketch lines having been earlier made while it was in that position.

FIG. 4 is a view of the underside of the clipboard turntable, taken in the direction of arrows 4-4 of FIG. 2.

FIG. 5 is a view of the upper side of the part of the clipboard main body that normally underlies the clipboard turntable, taken in the direction of arrows 5-5 of FIG. 2.

FIGS. 12 through 17 are plan views of clipboard assemblies similar to the clipboard assembly of FIG. 1, including a clip at the top and registration marks. However, they have no turntables that are textured with a groove pattern. As a result, they do not have the circular support area beyond the typical shape of a clipboard. Their textured groove pattern sections are on the upper surface of the clipboard body, and are in precise relation to the registration marks on the clipboard body. The registration marks preferably extend slightly above the plane of the upper surface of the clipboard body, but can be printed on that body if desired. These FIGURES show that the registration marks can be either two, three or four in number, and can be located on different parts of the clipboard body. There may be other arrangements of the registration marks than those typical ones shown, and still be within the purview of the invention. One common element is that at least one of the registration marks is a corner-positioned mark style, having two sections that are joined at a 90° angle. A modification of this corner-positioned mark is to have the two sections spaced from the actual corner yet sufficiently close to each other to act as a corner registration mark. The style of the registration marks are linear, corners, or may be only points marked by pins that extend vertically from the upper side of the clip assembly in the same manner as do the registration marks illustrated. The choices of the number, style and the location of the registration marks are also applicable to the clipboard assemblies of FIGS. 1-3 and 6-8.

FIG. 18 is a cross section view of the clipboard assembly shown in FIG. 14, taken in the direction of arrows 18-18 of that FIGURE.

FIG. 19 is a plan view of the part of the clipboard main body similar to the view shown in FIG. 5, but showing the groove in which the pin of the turntable is movable as the turntable is rotatable clockwise relative to the clipboard main body that as shown in FIG. 9. The groove is shown as being a semi-circular groove extending from the 000 position to the 180 position by way of the position 090. When this clipboard main body is reversed to be a mirror image of that shown in FIG. 19, so that the groove extends by way of the 270° position, the turntable is rotatable counterclockwise as is the case using the clipboard assembly shown in FIG. 11.

FIG. 20 is a view of the clipboard main body upper surface when the clipboard assembly is that shown in FIG. 10 is used. This view shows a circular groove.

FIG. 21 is a schematic representation of a drawing tool, also referred to as a marking instrument. It may be a pen (usually a ball-point pen) or pencil that is more commonly used, provided it has a sufficiently fine point, or one that is specifically made for this use.

DETAILED DESCRIPTION OF THE INVENTION

Figure 6:
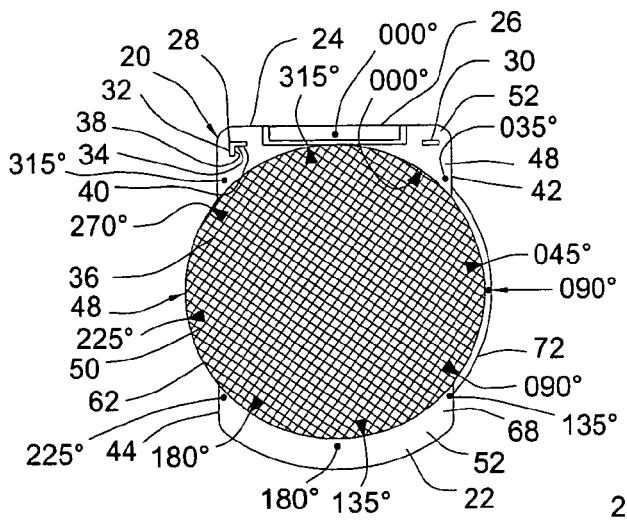
FIG. 6 is a plan view of the clipboard assembly shown in FIG. 1, after the turntable is rotated clockwise 35° from its position shown in FIG. 1 to the 045°

There are two groups of disclosure of the invention of a clipboard assembly. Each of these groups has variations of the details of the invention that are contained in the disclosures belonging to each of these groups. They may be referred to at times as a group including a turntable feature, and a group that does not include the turntable feature of the invention. Thus the group including the turntable feature builds on the other group and yet is all a part of the same invention that provides improvements over the Phillips patent.

Both groups of disclosure of the invention use the feature of the same registration marks on a clipboard that are an integral part of the broad invention, and both groups use the textured groove patterns of the prior U.S. Pat. No. 3,384,964, issued on May 28, 1968 to R. E. Phillips, and may use other patterns as well. Therefore, both groups use inventive improvements to the disclosure of that patent that constitute various features of the invention herein disclosed and claimed.

The first group of disclosures are provided in FIGS. 1-11, 19 and 20. It is the group that includes a turntable, and it is the group that is being first described below. The second group of disclosures are provided in FIGS. 12 through 18. These disclosures have all of the features of the invention except the turntable. The clipboard assembly 120 of these FIGURES illustrate a less complicated clipboard assembly that has embodiments of the invention herein disclosed and claimed, but omits the turntable of the first group. FIG. 21 shows a drawing tool or instrument, in schematically simple form, that is used with each of the groups.

FIGS. 1-11, 19 and 20 relate to the first group. Because the preferred version of the invention is the one in the first group, with much of the similar construction of the second group, the initial part of the description contains references to the showings in the drawing that relate to both groups. The second group is then described more specifically.

FIGS. 1-11 illustrate the clipboard assembly 20, which is the preferred embodiment of the invention, and FIGS. 12-18 illustrate a less complicated clipboard assembly 120 that is another embodiment of the invention that does not have some of the features of the clipboard assembly 20. FIGS. 6-11 show variations of the generic clipboard assembly 20, primarily related to the restrictions regarding the amount of arc that the turntable may be rotated to provide various orientations of the grooves that are the textured groove pattern that is formed on the upper surface of the turntable. Because there are several common features that will be first described, using numbers below the 100 series to identify each part of clipboard assembly 20, and using comparable numbers beginning in the 100 series when referring to the clipboards 120 of FIGS. 12-18.

FIGS. 2, 5, 19 and 20 relate to the various modifications of the upper surface of the clipboard main body portion that normally underlies and rotatably supports the turntable of any of the clip assemblies described in the descriptions of FIGS. 1-11.

The clipboard assembly 20 and the clipboard assembly 120 each has a generally rectangular shape, with a lower end 22, 122, and an upper end 24, 124, with a spring-loaded clip 26, 126 extending across and being secured to the clipboard upper end 24,124 so that it is substantially parallel to the edge of upper end 24,124 of each of the clipboards 20, 120. The clip 26, 126 is located between two registration marks 28, 128 and 30,130 that are on the clipboard assembly 20, 120. The location and presentation of these two registration marks, as seen in FIGS. 1, 3, and 6 through 11, and also in FIGS. 12-18, are preferable. It is desirable to have at least both the registration marks 28, 128 and 30, 130, but it is to be understood that the registration marks 30, 130 are not absolutely required. This is shown in FIGS. 12, 15, 16 and 18, for example. The registration marks 28 and 128, as shown in FIGS. 1, 3, 6-11, and 12-17, have two portions 32, 132 and 34, 134, shown on the upper left corner of the clipboard 20,120, and also on one or more other corners in FIGS. 14-16. These portions are at right angles to each other on each of these registration marks, so that the inner surfaces of 32,132 and 34,134 that join at the inner sides of those registration marks are in position to receive and engage a right-angled corner $C_1$ of a paper sheet P that is to be secured to the clipboard 20, 120 by the clip 26, 126, so that the paper sheet P is at a precise position in relation th the textured groove pattern section 36, 136 of the clipboards 20, 120, respectively. Instead of making the corner registration marks 28, 128 much like a very short piece of some angle iron, the two parts having the inner surfaces of 32, 132 and 34,134 may be spaced from the juncture of the two parts of the other corner ones shown, and still have the same function, and may be called open-cornered registration marks instead of linear registration marks 30, 130, so long as they serve only one paper sheet corner such as corner $C_1$. Such an open corner registration mark is shown in FIG. 14 in the upper right corner of that FIGURE. The terms "corner-positioned mark", "corner registration mark", "open-cornered registration mark", and "L-shaped registration mark", whether being singular or plural, are all generically "corner registration marks" and sometimes simplified to just "corners."

FIG. 3 shows such a paper sheet P in place on the clip board assembly 20. The paper sheet P can be drawn upon by using a drawing tool T while the paper sheet is retained in such precise position, and can be removed from the clipboard assembly 20, 120 by releasing the clip 26, 126. It can later be re-mounted on the clipboard assembly 20, 120 and, by engaging its upper left corner $C_1$ with the side surfaces 38 and 40 of the two portions of the respective registration marks 28 and 128, and be clipped to the clipboard to hold the paper sheet in place on the clipboards 20, 120, with all of its drawings that were earlier made being in full registration location on their respective clipboards. When the linear style registration mark 30, 130 is used, also as shown in FIGS. 1-3, 6-8, and 10, 11 and 14, it is, or they are, each engaged with an edge $E_1$, $E_2$, $E_3$ or $E_4$ of the paper sheet P. It is important that at least one of the registration marks is the corner style such as are the registration marks 28, 128. By requiring one such, the paper is quickly and easily at least initially located by placing one of its corners into the corner style registration mark, locating it between the ends of the clipboard main body 42 and also parallel to the sides 44 and 46 of the clipboard main body. If no corner registration mark should be available, then the paper P would have to be laid down on the clipboard body and aligned either leftward and rightward, and/or upward and downward, but is not so easily aligned in both directions at the same time as it is when having and using registration marks. Placing a sheet of paper P in the precise position required should be very easy, and become almost automatic to the sketcher, and yet always be the correct position.

It is to be fully understood that a clipboard assembly 20, 120 embodying the invention can be made to accommodate any size of paper, with the most common ones being 8.5×11 inches, 8.5×14 inches, 11×17 inches, or A6 that is commonly used in Canada and some other countries, or any size that is likely to be used often by a sketcher. Since a clipboard assembly is usually carried by hand and used as needed, it should be of a size, shape and weight that it is easily so transported and used.

The following descriptions relate specifically to FIGS. 1 through 5, with some comments also relating to the clipboard assemblies of FIGS. 6-11 as part of one group, and the clipboard assemblies of FIGS. 12 through 18 as part of another group. In all of the clipboard assemblies or parts thereof shown in FIGS. 1-11, 19 and 20, there is a clipboard assembly 20.

Turntable 48 has its upper surface 50 lying in the same plane as the clipboard parts 142 that are adjacent to the turntable. Turntable 48 is apart of the clipboard assembly 20. The turntable 48 has the textured groove pattern section 36 on its upper surface 50, instead of being on a continuous part of the upper surface 52 of the clipboard main body 42 of FIGS. 1, 2 and 5. The turntable 48 has subtle but definitely existing small grooves forming the textured groove pattern section 36. These are not individually identified because they are small and narrow, and very numerous, as they are disclosed in the Phillips reference noted above. They must be able to be penetrated, even very slightly, with the point $T_1$ of the sketching tool T, as above noted, when sketches are being made. Turntable 48 also has an underside or lower surface 54, further described below.

Turntable 48 is rotatably movable under the paper sheet P so that lines may be sketched at angles to each other which may or may not be at right angles with each other. Lines are drawn on the upper surface of a paper sheet P with a writing or sketching tool T, schematically shown in FIG. 21, so that its point is also aligned with the same groove that guided the pointed end $T_1$ of the writing tool T in the desired direction. As is shown and described in the pending application cited, it must be able to push the part of the paper sheet P overlying a purposely selected groove of the textured groove pattern 36 into the selected groove and to deposit a material such as the graphite of a pencil, or the ink of a pen, on the paper sheet as the sketching tool point $T_1$ is moved along a selected groove, leaving a sketched linen the upper side of the paper.

The basic concept to draw a line using a groove and a writing device, but not the provision of the turntable 48, is also found in the cited patent to Phillips as well as in U.S. patent application Ser. No. 11/508,767 of which this application is a continuation-in-part, and need not be further described herein at this point. While this concept is not the invention herein disclosed and claimed, it is a basis from which the improvements constituting the claimed invention was conceived, albeit some forty years later during which time the present invention was not known or developed.

Figure 10:
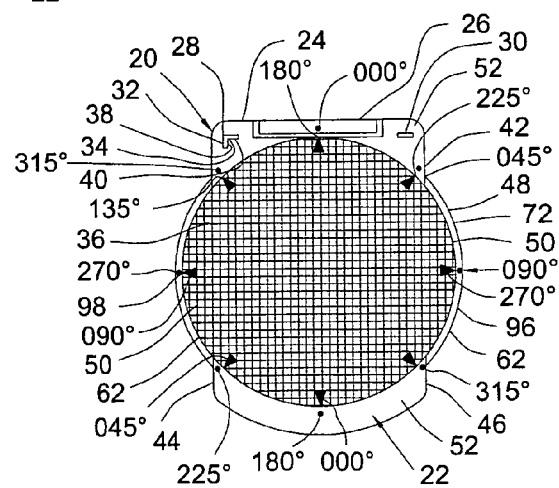
FIG. 10 is a plan view of a clipboard assembly which is similar to the image of the clipboard assembly shown in FIG. 1, but has the arced sections of the clipboard main body, which are under the turntable, on both sides of the clipboard assembly. This provides full support to the turntable when it is normally be turned in the either the clockwise or the counterclockwise direction from the 000° standard position through 360°, and still be fully supported by the arced sections that are on both sides of the clipboard main body. In this instance, the turntable has been rotated either counterclockwise 90°, or clockwise 270° from its 000° standard position, to the 270° position, thus showing the vertical lines of the textured groove pattern to be at 270° and 090° angular positions relative to those groove pattern vertical lines shown in FIG. 1.

As better seen in FIGS. 2 and 4, the turntable 48 has a center recess 56 that receives the spindle 58 so that the rotating disc forming the turntable 48 is rotatable on the spindle 58, also seen in FIGS. 2 and 5, that extends slightly upward from the portion 60 of the clipboard main body 42 that is normally underneath the turntable 48. In its broadest sense, as shown in FIGS. 19 and 20, this rotation of the turntable is permissible to the extent of a desired different degree, from 000° to 090° to the right to the left, or both, or 180° in either direction, or 270°, or even to a full 360° if need be. It is preferred that the arrangement shown in FIG. 5 be used, with the rotation of the turntable being limited to 90° in the clockwise direction from the normal 000° position. That position and the range of positions between 000° and 090° is sufficient to make any other angled drawing lines, and it is more easily made The turntable 48 also has a saw-toothed or knurled outer edge surface 62 that permits the user to easily rotate the turntable 48, using a finger or a thumb engaging the knurled edge 62 of the turntable that extends beyond the clipboard main body on the opposite side 44 from the side 46 thereof that is underneath the turntable 48 but outside of the standard rectangular shape of a clipboard, such a standard rectangular clipboard shape being shown in FIGS. 11-18. When the clipboard main body 42 is shaped as shown in FIG. 10 as main body 68, however, there are parts 70 and 72 of the clipboard main body 68 that extend arcuately on both sides, and directly support the turntable completely. The edge 62 of the turntable cannot then be easily accessed for the purpose of rotating the turntable 48, so, the sketcher's finger or fingers are expected to be used to engage parts of the textured grove pattern 36 that are not covered by the paper sheet upon which a sketch is being made, and push it to rotate as desired.

Partial rotation of the turntable 48 moves the turntable to the desired angle that the user wants to draw an angled line relative to another line that is not perpendicular to the angled line to be drawn. This desired angle may be any angle between the turntable limits of rotation, and not only the cardinal or inter-cardinal angles that are numerically identified. The turntable 48 can also be moved counterclockwise from an angled-line position so as to place it again at its normal rotated position, which is 000°, or to a different smaller angularly-selected position.

Figure 11:
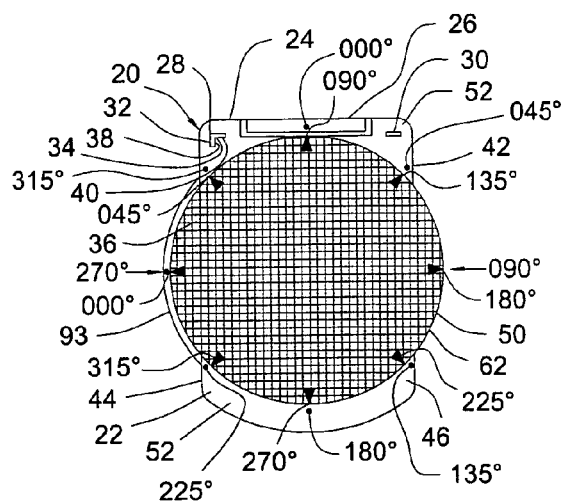
FIG. 11 is a plan view of a clipboard assembly in which the clipboard main body is the reverse image of the one shown in FIG. 1. The view is taken after the turntable has been rotated counterclockwise 90° from its 000° standard position, similar to that shown in FIG. 1, to the 270° position shown, thus showing the vertical lines of the textured groove pattern to be at 090° and 270° angular positions relative to those groove pattern vertical lines shown in FIG. 1. This clipboard assembly preferably allows the turntable to be moved in the counterclockwise direction through either a range of 90°, using a one-quarter circular groove, not further shown, that is the reverse image of the groove shown in FIG. 5, or a range of 180°, using reverse image, also not further shown, of the semi-circular groove shown in FIG. 19, with the range being centered on the cardinal angle of 270°. If, for any reason, the range of 180° is desired to be centered on the cardinal angle of 180°, then the semi-circular groove of FIG. 19 would just be moved clockwise for 90°. If, for any reason, the range of 180° is desired to be centered on the cardinal angle of 000°, then the semi-circular groove of FIG. 19 would just be moved counterclockwise for 90°. All of these location variations are considered to be within the purview of the invention.

It is to be noted at this point of the description that, while the turntable 48 can be so made that it can rotate only clockwise from its standard 000° position shown to a maximum of 090°, and afterward counterclockwise back as far as to its standard 000° position, the sketcher can still draw lines at any desired acute or obtuse angle or angles to the lines previously drawn. Whether the turntable 48 is permitted to rotate only in one direction from its standard 000° position, as shown in FIGS. 1 and 2, or to be able to rotate in either a clockwise or counterclockwise direction from that standard position as shown in FIGS. 10, 11 and 19, described below, stops 74 and 76 may be provided which are engaged once that maximum degree of rotation is attained, preventing the turntable 48 from rotating further. When the turntable 48 is to be allowed to rotate to a maximum of 090° position, there is a stop 76 preventing the turntable 48 from being turned beyond that maximum of 090° position. A stop 74 is also provided to prevent the turntable 48 from being returned rotationally beyond the standard position shown where all of the grooves are either vertical or horizontal grooves, when the turntable is allowed to rotate in a clockwise movement from its 090° maximum turning position. This is the preferred arrangement, with the stops being the semi-circular ends 74 and 76 of the groove 80 in which a pin 64 on the underside 54 of turntable 48 is moved as the turntable is rotated, as seen in FIG. 5.

That arrangement is shown in detail in FIGS. 2, 4 and 5. As shown in FIGS. 2 and 4, on the underside or bottom surface 54 of the turntable 48 there is a small, preferably cylindrical, pin 64 extending downwardly beyond the bottom surface 54 of the turntable 48. This pin 64 is located near but somewhat inward from the perimeter edge 62 of the turntable. Also as shown in FIGS. 2 and 4, there is also a cylindrical recess 56 in the bottom of turntable 48, with its opening 66 being in the plane of the bottom surface 54. This opening 66 receives a coordinated support spindle 58 that extends upwardly from the upper surface portion 60 of the clipboard 20 that normally lies immediately under the turntable 48, once that turntable is installed. The upper surface portion 60 has the spindle 58 extending from it is shown in FIGS. 2 and 5. The spindle 58 is also cylindrical, and mates with the cylindrical recess 56 of the turntable so that the turntable may be rotated by the sketcher about the axis 78 of the spindle 58 and the coextensive axis of recess 56 when desired. The height of the spindle 58 from the clipboard upper surface portion 60 is preferably no more than the depth of the cylindrical recess 56 in the bottom surface 54 of the turntable 48. It is preferred that the spindle 58 be very slightly less in height than the depth of the recess 56, so that the lower surface 54 of the turntable 48 is actually touching the upper surface 52 of the portion 60 of clipboard 20 and therefore this surface engagement provides a relatively small, yet definite frictional drag against the rotation of the turntable 48 as it is moved by the sketcher to a suitable arcuate location. This drag makes it easy to keep the turntable 48 in its rotated position that the sketcher desires in order to draw one or more lines that are relatively acutely or obtusely angular to the earlier-drawn lines but not necessarily perpendicular to those lines. When the turntable 48 has been rotated to the maximum 090° position, of course any lines then drawn using the illustrated textured groove pattern section 36 of the turntable 48 would then drawn either perpendicular to or parallel to the earlier drawn lines.

If it is desired to be able to rotate the turntable 48 both clockwise and counterclockwise from the standard position of 000°, the groove 82 may be rearranged to a semi-circular groove like that shown in FIG. 19, with the 090° position of the groove being moved arcuately 90°, thus making the groove then extend for 90° either side of the 000° position. In this event, or when the groove 82 is a semi-circle or greater, a pair of detents $D_1$ and $D_2$ are located on the bottom 86 of the arcuate groove 82 to be engaged by the turntable pin 64 indicate to the sketcher that the turntable is in the standard 000° position, but will permit the sketcher to move the turntable beyond the detents if that is his or her desire. Such detents may also be employed in other locations in other grooves similar to grooves 80, 82, or 84.

The detents $D_1$ and $D2$ may be small laterally extending bumps, located on the bottom of the curved groove or slot, such as grooves 82 and 84, receiving the pin 64 and spaced just far enough apart to permit the pin 64 to first rise up slightly, causing the turntable 48 to also rise slightly, which can be felt by the sketcher as he or she moves the turntable. The turntable will then move back downward when the end of pin 64 has passed over the first detent $D_1$ of these detents, and will tend to settle in-between the two detents $D_1$ and $D_2$, engaging both of them so that the location of the turntable 48 is precisely as desired. This will lightly hold the turntable 48 in the position associated with that pair of detents, yet being subject to more rotation, either clockwise or counterclockwise, as desired by the sketcher. If the sketcher wants to move the turntable 48 arcuately still further, it can be done by forcing the pin 64 to once again ride up over the secondly-engaged detent $D_2$, and it will then be movable in the curved slot or groove 82 or 84 until it either reaches a stop 74 or 76 formed by an end of the curved slot or another set of detents $D_1$ and $D_2$, which can be circumferentially located to indicate the next cardinal angle, for example. There can be as many pairs of detents $D_1$ and $D_2$ as it is desired to tend to have the turntable 48 stop, or at least signal the sketch operator that a particular arcuate position of the turntable has been passed.

FIG. 19 illustrates the groove 82 provided in the upper surface of the clipboard 20 when the turntable 48 is able to rotate to any rotatable position between its standard 000° position and its clockwise position of 180°, passing the 090° position when it started at a larger degree than the 0900 position and also can be precisely positioned at its standard 000° position. The groove 82 is a semi-circular groove that has one extreme end 88 like that of the groove end 74 and the other end 90 like that of end 76. The turntable's standard 000° position is therefore at one semi-circular end 88 and that end has a centerline 92, and the turntable's standard 180° position is at the other semi-circular end 90, which had a centerline 94. When the pin 54 must pass over the location of the 090° position, there is a set of detents $D_1$ and $D_2$ positioned at that location which are like the set of detents $D_1$ and $D_2$ previously described. They provide a detent-caused warning that the pin 64 is over, then has passed beyond, the 090°position. It is understood that, because the turntable 48 is not fastened to the clipboard 20, the turntable may be moved upward to a small extent that is about the height of the detents from the bottom of the groove at the location of the 090° position, so that the sketcher feels that movement upward over the first of the detents $D_1$ and then slightly downward, followed by another upward movement and then another downward movement as the pin 54 passes over and beyond the second detent $D_2$, after which the sketcher either stops the turntable at the desired angle or returns it to the precise position of its standard 000° position.

When the sketcher desires to draw one or more lines that are at angles other than 90°, he or she rotates the turntable, using a thumb or finger that engages the saw-toothed or knurled surface 44 on the side forming the edge of the turntable, setting the desired angle to an already-drawn line, and then draws that line or lines. Such angles may be either acute or obtuse, as desired by the user. As better seen in FIG. 2, the clipboard 20 has a center hole where the rotating disc forming the turntable 48 is rotated to a desired different degree, from 0° to 90° in a clockwise or a counterclockwise direction, or in both directions between 090° and 270° and including 000°. However, such rotations beyond the 090° point is really unnecessary when working with the straight lines in graphic form as shown in FIGS. 1,3, and 6-8. The turntable has subtle but definitely existing small grooves forming the textured groove pattern section. It also has the knurled edge surface 44 that permits the user to rotate the turntable 48 either clockwise or counter-clockwise to the desired angle that the user wants to draw an angled line relative to another line that is not perpendicular to the angled line to be drawn. The sketcher can also move the turntable and draw other lines at other angles to the extent desired.

FIG. 6 shows the upper surface of the clipboard assembly 20, including the registration marks 28 and 30 as well as turntable 48, when the turntable is to be arcuately movable only between the standard 000° position and the location of its maximum of the 090° position if being allowed to be rotatable clockwise from its standard 000° position. Here, it is shown as having been rotated counterclockwise from its standard 000° position to the 035° position.

Figure 7:
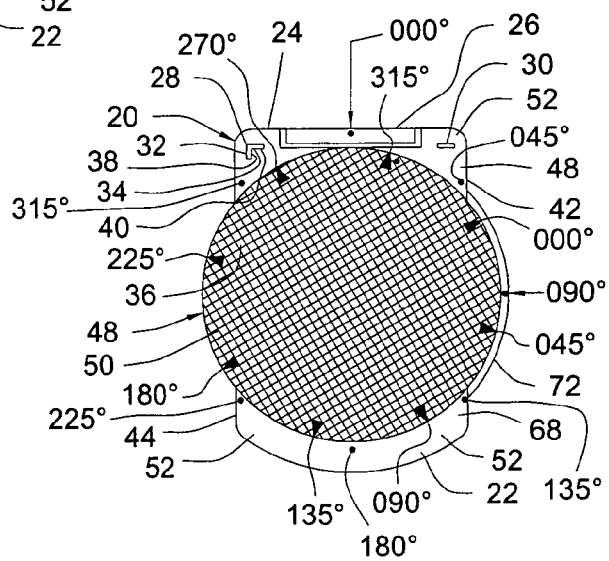
FIG. 7 is a plan view of the clipboard assembly shown in FIG. 1, after the turntable is rotated clockwise 60° from its position shown in FIG. 1 to the 060° position, thus showing the vertical lines of the textured groove pattern to be at 60° and 240° angular positions relative those groove pattern vertical lines shown in FIG. 1.

FIG. 7 shows the same view as seen in FIG. 6. However, in this FIGURE is shown as having been rotated counterclockwise from its standard 000° position to the 060° position.

Figure 8:
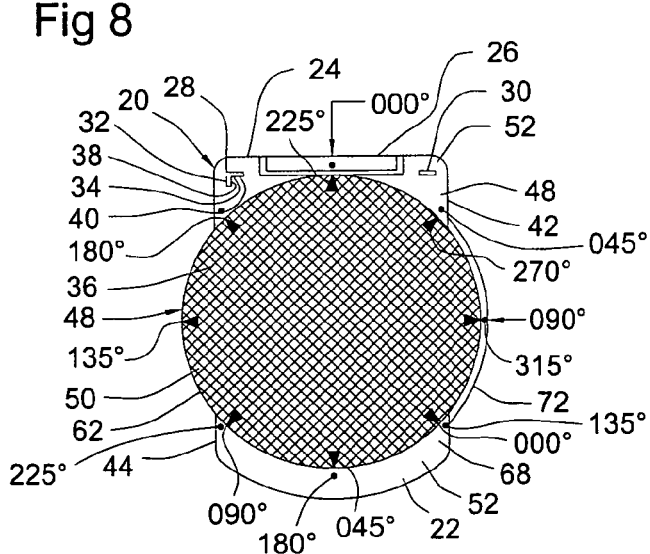
FIG. 8 is a plan view of the clipboard assembly shown in FIG. 1, after the turntable is rotated clockwise 45° from its position shown in FIG. 1 to the 045° position, thus showing the vertical lines of the textured groove pattern to be at 45° and 135° angular positions relative to those groove pattern vertical lines shown in FIG. 1.

FIG. 8 shows the upper surface of the clipboard assembly 20, including the turntable 48, when the turntable is to be arcuately movable though a semi-circular range between the standard 000° position and the location of its maximum 180° position to the 135° position when it is allowed to be rotatable clockwise from its standard 000° position. The groove controlling the range of movement of the turntable 48 to move in this manner is shown in FIG. 19. If the turntable is permitted to rotate through 360°, this same position can be reached by rotating the turntable in either direction. The groove 84 controls the range of movement of the turntable 48 to move in this manner, and is shown in FIG. 20.

Figure 9:
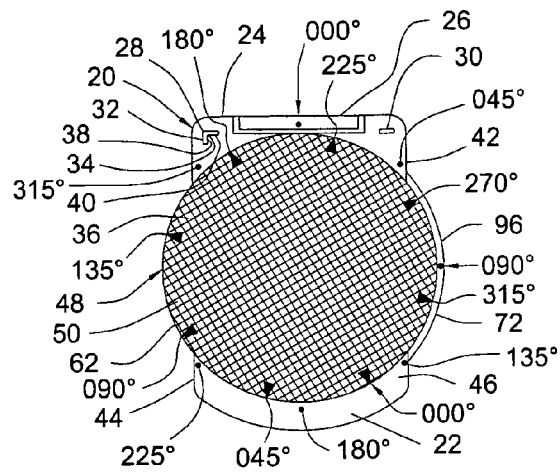
FIG. 9 is a plan view of the clipboard assembly shown in FIG. 1, after the turntable is rotated clockwise 150° from its position shown in FIG. 1 to the 150° position, thus showing the vertical lines of the textured groove pattern to be at 150° and 330° angular positions relative those groove pattern vertical lines shown in FIG. 1.

FIG. 9 shows the upper surface of the clipboard assembly 20, including the turntable 48, when the turntable is to be arcuately movable though a semi-circular range between the standard 000° position and the location of its maximum 180° position to the 150° position when it is allowed to be rotatable clockwise from its standard 000° position. The groove controlling the range of movement of the turntable 48 to move in this manner is shown in FIG. 19. If the turntable is permitted to rotate through 360°, this same position can be reached by rotating the turntable in either direction. The groove controlling the range of movement of the turntable 48 to move in this manner is shown in FIG. 20. While it would be somewhat unusual to allow a clockwise movement of the turntable 48 from the standard 000° position to the 270° position, it is within the bounds of the herein disclosed and claimed invention to do so, or even to some other range limit not shown in the drawing, although there is no readily apparent reason to do so, using a groove similar to the grooves 80 and 82 of FIGS. 19 and 20, extending through such a desired range limit, with whatever those desired range limits may be.

FIG. 10 shows a modification of the clipboard main body in which the turntable is rotatable to points that, in the FIGS. 1,3, and 6-9 would leave the left part, as viewed in those FIGURES, unsupported by an arcuate part of the clipboard main body. Instead of having a straight side 44 of the main body on the left side, there is another arcuate side 98 that supports the left outer part of the turntable 48 in the same manner that the similar arcuate side 96 shown in FIGS. 1,3 and 6-9. This construction is used if the clipboard main body is to be supportive of the turntable 48 under all conditions of rotation.

FIG. 11 shows a modification of the clipboard main body in which the turntable is rotatable to points that, in the FIGS. 1,3, and 6-9 would omit the right part 96, and use only the arcuate part 98. This arrangement is in effect a mirror image of the shape of the clipboard main body shown in FIGS. 1, 3, and 6-9, with support by an arcuate side part of the clipboard main body being on the left side only, as seen in this FIG. 11. It would have a straight side 46 of the main body on the right side, and support only the left outer part of the turntable 48 instead of the right outer part of the of the turntable. This construction may be used for the same purposes as the assemblies of FIGS. 1,3, and 6-9, and would be likely to be used if the rotation of the turntable is permitted only from the standard 000° position to either the 270° position or the 180° position by way of the 270° position. Yet, even when the turntable is allowed to be rotated throughout 360°, or restricted to some other limit, there is no embracing need to use both arcuate parts 96 and 98, or either of them. They are more protective of the turntable 48, and that alone is usually a sufficient reason to use at least one of them, and preferably both of them, irrespective of the range of turntable rotation. Of course, both arcuate parts 98 will be able to have the grooves 80, 82 or 84 formed in the underside of the clipboard main body 42, while with only one arcuate part, the use of groove 80 and 82 are usable. The use of groove 84 requires both arcuate sides 96 and 98 that are shown in FIG. 10.

FIGS. 12 through 18 shows a more simple version of the clipboard than the one shown in the prior FIGURES. It is a clipboard 120 that has no turntable, and therefore is of a more standard form of clipboard. It has straight sides 156 and 158 that are parallel, and extend from the lower end 122 to the upper end 124. It has the same vertical and horizontal grooves in its textured groove pattern 136, and performs the same as does the clipboard 20 when that turntable 48 is in the standard 000° position shown. It is an illustration of using only one feature of the invention, namely the provision and use of the registration marks, together with the provision and use of a clip, to very precisely locate the paper sheet on which drawings are to be made, and make such precise location repeatable, which the Phillips did not have.

More specifically, FIG. 12 shows the basic clipboard 120, with only one corner registration mark 150. The paper sheet P is in place with its corner $C_1$ in contact with the two parts 152 and 154 of that corner registration mark. This use of the one corner mark is able to locate the paper sheet P, but not necessarily as easily and precisely when at least one additional registration mark is used that has an edge or the paper sheet P engaged, some distance away from the corner mark 150. Several such corner mark arrangements are shown in the FIGS. 13 through 17. They are considered to be some samples of different ways in which the use of registration marks can be incorporated. They are not to be understood as limiting arrangements coming within the purview of the invention to just these arrangements. Still other arrangements using registration marks are included within the invention disclosed and claimed.

FIG. 13 shows the basic clipboard 120, with one corner registration mark 150. The paper sheet P is in place with its corner $C_1$ in contact with the two parts 152 and 154 of that corner registration mark. It also shows a second registration mark 160. This mark is a linear registration mark, and in this Figure it is engaged by the top edge $E_1$ of the paper sheet P that is in its desired position on the clipboard. This use of two registration marks, one of which is a corner registration mark, is very simple to use, and will result in the paper sheet P being in the precise position desired, whether it be the first time or a second or more times that it has had this desired position on clipboard 120.

FIG. 14 shows the basic clipboard 120, with one corner registration mark 150 at the bottom of the paper sheet P is in place with its corner $C_3$ in contact with the two parts 152 and 154 of that corner registration mark. It also shows an open-cornered registration mark 170, having its two the two sections 172 and 174 spaced from the actual corner yet sufficiently close to each other to act as a corner registration mark. In addition, a linear registration mark 160 is used to positively locate the edge $E_4$ of the paper sheet P, near the corner $C_4$ of the paper sheet P, acting together with the section 154 of the corner registration mark 150 located at corner $C_3$ of the paper sheet P, FIG. 15 shows the clipboard assembly 120 with two corner register marks 150 being used to precisely locate the paper sheet P. The upper one of the corner register marks 150 has its sections 152 and 154 in engagement with the corner $C_1$ of the paper sheet P. The lower one of the register marks 150 has its sections 152 and 154 in engagement with the corner $C_3$ of the paper sheet P. With this arrangement the paper sheet P is moved from the right to respectively engage its corners $C_1$ and $C_3$ with the respective parts 152 and 154 of the upper and lower corner register marks, and also to pass under the open clip 120, which is then closed to hold the paper sheet P in its position.

FIG. 16 illustrates another arrangement of the registration marks on the clipboard 120 having the paper sheet P's two corner registration marks 150, located at diagonal corners $C_1$ and $C_4$. This arrangement would assure that the paper sheet's corners are in the precisely correct location.

FIG. 17 shows an arrangement of the registration marks on the clipboard 120 which is similar to the arrangement shown in FIG. 13 in which one corner registration mark 150 is used, and the one other registration mark used is a linear registration mark 160. However, this latter registration mark is at or at least very near the corner $C_3$ and is in engagement with the paper sheet's edge $E_3$ instead of its top edge $E_1$ when looking at FIG. 13.

FIG. 18 shows a cross-section view of the clipboard of FIG. 14, taken in the direction of arrows 18-18 of that FIGURE. It shows the clipboard body 120 in cross-section, and the registration marks 150 and 160 located back of the cross-section plane where the view is taken, and therefore they are not in section. It also shows the paper sheet P in cross-section, lying on the top surface of the clipboard 120 where the textured groove pattern is located.

FIGS. 19 and 20 are fully described above, and therefore no further descriptions of them are needed FIG. 21 schematically and in a very simple manner a drawing tool T that is used when drawing lines using the invention. It has a very fine point $T_1$ which is sufficiently small in size to push parts of the paper sheet P into one of the textured grooves as earlier described. It may be a pencil or have a nib or be a ball point pen, as is desired.

One of the primary advantages of the invention herein disclosed and claimed it that, if at any time, the sketcher wants to remove the paper sheet P from the clipboard 20 or 120, it is very simple to do so without fear that other lines may later be added to the sketch then on the paper sheet P without having a problem of re-aligning the paper sheet on the clipboard 20 or 120 so that any line later drawn so as to be complementary to one or more lines that had been previously drawn on the paper sheet P before the paper sheet was removed from the clipboard 20 or 120. This is very easily accomplished by laying the paper sheet P back in position over the textured groove pattern section so that the appropriate paper sheet corners and edges are fitted to the inner surfaces of the paper sheet registration marks with the paper top end being under the clip 26. Another primary advantage of the invention herein disclosed and claimed is the provision of the turntable, so that a clipboard with typical horizontal and vertical intersecting grooves can be used to draw lines at relative angles other than just 90°. A third primary advantage of this invention is the ability to change turntables quickly and easily so that different textured groove patterns may be used when desired. Instead of requiring several separate clipboards, only extra turntables are needed. This is both a convenience and expense advantage.

There seems to have been no more advancements of the type of sketching shown by Phillips until the inventors named herein began to improve on Phillips's structure and in the process make additional inventions. The identical structure shown by Phillips, whose patent expired some twenty or more years ago, is still being marketed, with the patent number of the Phillips patent noted thereon, even though that patent expired some years ago, and that marketed device shows no improvements to subject matter of the Phillips patent. While it did, and still does, meet a need to some extent, the improvements made by the inventors named herein have vastly improved the meeting of that need.

What is claimed is as follows:

1. A clipboard assembly having a clipboard main body having a first section and a second section, said first section being basically rectangular in shape and having an upper end and a lower end, a left side and a right side, said first section also having a flat upper surface that has a depressed portion extending from below a portion of said flat upper surface upper and lower ends, and extending at least to one of said first section's left and right sides and beyond the other of said first section's left and right sides so that said depressed portion is circular with an arcuate part removed beyond the one of said first section's's left and right sides when said flat upper surface depressed portion does not extend beyond the one of said first section's left and right sides, and a spring clip on said upper end of said clipboard main body first section;

said clipboard assembly main body second section being a circular turntable with its upper surface being in the plane of the main body flat upper surface and its lower surface being in planar face relation to said depressed section, said flat upper surface of said turntable and said clipboard main body first section's being substantially the same plane and in position to receive thereon a paper sheet on which one or more sketches may be made;

said clipboard assembly main body turntable's flat upper surface having a textured groove pattern which is usable to sketch on the paper sheet using with a tool that engages the paper top surface and moves a portion of the paper sheet over each groove into a particular groove selected by a sketcher to create a line on the top of the paper sheet that is the precise shape of said particular groove, and to do so with other lines using others of said grooves as needed to make at least a part of a desired sketch, including making such other lines on the paper sheet at different angles to each other by rotating said turntable within said depressed portion of said clipboard main body first section to attain any desired angle of such lines that are drawn relative to each other, and at least one raised registration mark on said clipboard main body first section, said at least one raised registration mark providing an index for the initial placement of a paper sheet over said upper surfaces of said first and second main body sections in a preset precise location on said clipboard main body first section and said section thereof to be drawn upon;

said at least one raised registration mark also providing an index for the later replacement of the same paper sheet in said same preset precise location on said clipboard main body in a reproducible drawing manner after the paper has been drawn thereon and removed from the board main body, in said same precise same location on said clipboard main body for additional drawing thereon that is in precisely the same location relative to said main body first part that it occupied when it may have been previously drawn thereon.

2. The clipboard assembly of claim 1, said at least one raised registration mark being only a single registration mark that is engageable with only one edge of a paper sheet and when so engaged acts to define the exact position of that one edge of the paper sheet relative to said clipboard assembly's main body first section.

3. The clipboard assembly of claim 2, said at least one raised registration mark being a single raised registration mark characterized by having two raised sections thereof, both sections of which are adapted to concurrently have only one paper sheet edge engageable therewith so that the paper sheet is precisely positionable on said clipboard assembly relative to said two sections of its said single raised registration mark and is substantially prevented from movements transverse to said at least one raised registration mark.

4. The clipboard assembly of claim 3, said at least one raised registration mark extending only in a single straight line direction.

5. The clipboard of claim 1, said at least one raised registration mark having two separate raised registration mark sections, each of which extends only in a single straight line direction on said clipboard body assembly first section either only on the top and the bottom sides, or only on the left and right sides, thus allowing oversized paper sheets to be properly located and relocated either vertically or horizontally on said clipboard body assembly.

6. The clipboard of claim 5, there being at least two separate raised registration marks, each having only one section, and being aligned only in linear fashion in the same direction on said clipboard body assembly first section.

7. The clipboard of claim 6, said two separate raised registration marks being located on one side of said Clipboard body assembly first section.

8. The clipboard assembly of claim 1, there being two separate raised registration marks with one of said two separate registration marks being located on each end of said clipboard body assembly first section, and thus being able to receive said paper sheet as a continuous sheet that is on a roll, with the continuous sheet being moved in a horizontal movement guided by said two separate raised registration marks.

9. The clipboard of claim 6, said two separate raised registration marks being located on the only one side of said Clipboard body assembly first section.

10. The clipboard of claim 6, said two separate raised registration marks being located on the upper end of said Clipboard body assembly first section.

11. The clipboard of claim 6, said two separate raised registration marks being located on the lower end of said clipboard body assembly first section.

12. The clipboard of claim 6, said two separate raised registration marks being located on only one side of said Clipboard body assembly first section.

13. The clipboard of claim 6, said two separate raised registration marks being located with one on each side of said clipboard body assembly section.

14. The clipboard of claim 5, said two separate raised registration marks being laterally spaced apart in parallel fashion with one of the two separate raised registration marks being on the upper end of said clipboard body first section and the other of the two separate raised registration marks being on the lower end of said clipboard body first section.

15. The clipboard of claim 1, said at least one registration mark being a single straight line located at the one of the upper and lower ends of said clipboard body first section so that said clipboard single registration mark is engageable by the one of the width-extending sides of a paper sheet that precisely locates the paper sheet in a specifically vertical direction and the paper sheet that is within the upper and lower and side edges of the paper sheet may be positioned at least over and possibly beyond said clip body assembly clipboard body first section as well as beyond the upper surface of said clip clipboard body second section when the paper sheet is greater in length and width than that of the standard paper sizes of commonly used paper sheets of approximately 8.5 inches in horizontal width and 11 inches up to 14 inches in vertical length to simultaneously cover a greater total area than the upper surface area of at least one of said clipboard body first and second sections.

16. The clipboard assembly of claim 15 in which said at least one registration mark is located in a single straight line and includes two or more linearly-separated parts thereof.

17. A clipboard assembly having a clipboard main body having a first section and a second section, said first section being basically rectangular in shape and having an upper end and a lower end, a left side and a right side, said first section also having a flat upper surface that has a depressed portion extending from below a portion of said flat upper surface upper and lower ends, and extending at least to one of said first section's left and right sides and beyond the other of said first section's left and right sides so that said depressed portion is circular with an arcuate part removed beyond the one of said first sections's left and right sides when said flat upper surface depressed portion does not extend beyond the one of said first section's left and right sides, and a spring clip on said upper end of said clipboard main body first section;

said clipboard assembly main body second section being a circular turntable with its upper surface being in the plane of the main body flat upper surface and its lower surface being in planar face relation to said depressed section, said flat upper surface of said turntable and said clipboard main body first section's being substantially the same plane and in position to receive thereon a paper sheet on which one or more sketches may be made;

said clipboard assembly main body turntable's flat upper surface having a textured groove pattern which is usable to sketch on the paper sheet using with a tool that engages the paper top surface and moves a portion of the paper sheet over each groove into a particular groove selected by a sketcher to create a line on the top of the paper sheet that is the precise shape of said particular groove, and to do so with other lines using others of said grooves as needed to make at least a part of a desired sketch, including making such other lines on the paper sheet at different angles to each other by rotating said turntable within said depressed portion of said clipboard main body first section to attain any desired angle of such lines that are drawn relative to each other;

and at least one registration mark on said clipboard main body first section, said at least one registration mark providing an index for the initial placement of a paper sheet over said upper surfaces of said first and second main body sections in a preset precise location on said clipboard main body first section and said section thereof to be drawn upon;

said at least one registration mark also providing an index for the later replacement of the same paper sheet in said same preset precise location on said clipboard main body in a reproducible drawing manner after the paper has been drawn thereon and removed from the board main body, in said same precise same location on said clipboard main body for additional drawing thereon that is in precisely the same location relative to said main body first part that it occupied when it may have been previously drawn thereon.

18. A sketching device comprising:

a paper support clipboard assembly having a first major part and a second major part, said second major part of said assembly being a circular turntable having a flat upper turntable first surface;

said first major part of said assembly having a normally upwardly located end first portion and a normally downward end second portion thereon, said first and second portions of said first major part of said assembly respectively have thereon a first flat surface and a second flat surface which are located in a common first plane;

said first major part of said assembly further having a third portion that connects said first and second portions and is located below said first plane, said first major part third portion having arcuate connections with said first and second portions so that said circular turntable is received between said first and second planes, said third major part third portion thus being received on said third portion with an upper surface that lies within said first plane that also has therein said first and second flat surfaces, and a lower surface that is the bottom part of said clipboard assembly that is said first major part third portion;

said circular turntable second assembly second part third portion that is below said first plane over a circular area on said first major part third portion, said first major part third portion also having at least a substantially circular configuration defining that circular area, the circumference of which extends downwardly from said first flat surface on said first portion to a plane that is below the plane of said first and second flat surfaces, with said third flat surface being positioned so that it has a set diameter that extends arcuately outward on one portion thereof that extends radially beyond, the outer circumference of said turntable extending at least one arcuate part of said surface joining with said first and second flat surfaces radially outward and thus defining at least one radially extending side thereof;

said flat third flat surface having a spring clip secured thereto for holding a paper unit in place relative to said assembly first and second major parts, angular indicia identifying the angular amount of such indicia on said turntable from upper surface of said first major part third portion and also having at least one registration mark thereon which permits precise alignment of the sheet of paper relative to said flat upper surface of first part of said paper support clipboard and also relative to said flat upper surface of said second part whether said turntable has or has not been rotated relative to upper surface of said first major part third portion having upper surface of said first major part third portion having from which its amount of rotation is related, said indicia being on said first flat surface, resulting in the ability to either continue to draw lines on the sheet of paper that can be continuations of one or more of such lines or other lines can be drawn at any desired angle relative to the lines first drawn on the sheet of paper;

said assembly second major part having on its flat upper surface having at least a major section of the upper side thereof which has a large plurality of grooves spaced closely to each other formed into said flat surface, said grooves have such width and depth dimensions so that, when a sheet of paper is placed over said flat upper surface and an end of a marking instrument is urged against the sheet of paper, the paper is depressed into a selected one of said grooves and, as the marking in grooves instrument is then moved relative to the sheet of paper, it is guided by that one of said grooves so that the marking instrument leaves a line on the paper corresponding to the one of said grooves, the selection of that one groove and then other selected ones of said grooves various desired lines are drawn on the sheet of paper, the improvements comprising:

said paper support clipboard second major part being a rotatable part that is rotatably mounted on said first part of said clipboard, with the sheet of paper lying over at least a major part of said grooved upper side of said turntable and also over at least said one upper surface part of said first part of said clipboard which lies in substantially the same plane as the plane of the flat third surface of said clipboard assembly first major part, so that the sheet of paper has one side that is slidably engaged by the grooved surface so that said rotatable part is rotatable relative to said sheet of paper, thus permitting lines to be drawn on the sheet of paper that intersect at different angles from a line or lines that are or can be drawn on the sheet of paper before said rotatable part is rotated;

at last one of said at least two edges of the sheet of paper being a top end and another of said at least two edges of the sheet of paper being at least one side edge of the sheet of paper engaging said at least at least one registration mark, assuring that the sheet of paper, once placed on the flat upper surface having the grooves formed therein and at least one line drawn thereon and then having been removed from said paper support clipboard and later replaced on said paper support clipboard in it precise registration with the one groove earlier used to draw that at least one line, and as a result other lines may then be so drawn on the sheet of paper so accurately in relation to said at least one earlier drawn line that such other later drawn lines appear to have been drawn at the same tie as the earlier drawn at least one line;

the upper surface of said first major part third portion having thereon a groove therein that is at least in an arcuate part of said upper surface with a somewhat lesser radius than the radius of said turntable and extends at least for 90° from the said 000° angular location on said first flat surface, and said turntable lower surface has a pin extending therefrom and into said groove when said turntable is placed on said assembly first major part as above described, sand groove and said pin cooperating when said turntable is being turned to keep said turntable in its same location relative to said assembly first major part, said upper surface of said first major part third portion also having a center-located pin that receives a pin hole located at the rotational center of said turntable, said pin and pin hole supporting said turntable on said clipboard assembly first part so that it may be easily rotated as needed.

19. The sketching device of claim 18 wherein said groove that is in an arcuate part of said upper surface of said first major part third portion extends at least 180° from said 000° angular location indicia on said first flat surface, and may be extended to 270° or even back to the 000° angular location indicia should all 360° of rotation be preferred.

20. The sketching device of claim 19 wherein said groove has detents located at preferred angular intervals from the 000° angular location indicia, each of said detents, when engaged by said pin received in said groove, causes said turntable to be momentarily moved very slightly upward as said pin is engaged with any one of said detents, signaling that the turntable is at that time in a desired angular location such as at least any of the cardinal points of rotation degrees to which the turntable has just turned.

* * * * *